United States Patent
MacCready et al.

(10) Patent No.: US 10,372,143 B2
(45) Date of Patent: Aug. 6, 2019

(54) AUTOMATED AIR TRAFFIC CONTROL OF UNMANNED AIR VEHICLES

(71) Applicant: APIUM INC., Glendale, CA (US)

(72) Inventors: Tyler MacCready, Pasadena, CA (US); Alan Nise, Orange, CA (US)

(73) Assignee: Apium Inc., Glendale, CA (US)

( * ) Notice: Subject to any disclaimer, the term of this patent is extended or adjusted under 35 U.S.C. 154(b) by 0 days.

(21) Appl. No.: 15/925,714

(22) Filed: Mar. 19, 2018

(65) Prior Publication Data

US 2018/0267562 A1    Sep. 20, 2018

Related U.S. Application Data

(60) Provisional application No. 62/474,047, filed on Mar. 20, 2017.

(51) Int. Cl.
*G05D 1/10* (2006.01)
*B64C 39/02* (2006.01)
(Continued)

(52) U.S. Cl.
CPC .......... *G05D 1/104* (2013.01); *B64C 39/024* (2013.01); *G05D 1/0044* (2013.01); *G08G 5/0008* (2013.01); *G08G 5/0021* (2013.01); *G08G 5/0043* (2013.01); *G08G 5/0069* (2013.01); *G08G 5/0078* (2013.01); *G08G 5/04* (2013.01); *G08G 5/045* (2013.01); *B64C 2201/141* (2013.01); *B64C 2201/146* (2013.01)

(58) Field of Classification Search
CPC .... G05D 1/104; G05D 1/0044; B64C 39/024; G08G 5/0008; G08G 5/0021; G08G 5/0043; G08G 5/0069; G08G 5/0078; G08G 5/04; G08G 5/045
See application file for complete search history.

(56) References Cited

U.S. PATENT DOCUMENTS

| 5,521,817 A | 5/1996 | Burdoin et al. |
| 6,985,089 B2 | 1/2006 | Liu et al. |

(Continued)

OTHER PUBLICATIONS

U.S. Appl. No. 62/349,334, filed Jun. 13, 2016. (Year: 2016).*
(Continued)

*Primary Examiner* — Calvin Cheung
(74) *Attorney, Agent, or Firm* — Lewis Roca Rothgerber Christie LLP

(57) ABSTRACT

A method and system for automated air traffic management of unmanned vehicles that assures safety and continuous flow, even for vehicles of wide-ranging capabilities. Some embodiments include onboard equipment that distributes the burden of management across all the vehicles in a given airspace so that autonomous cooperation between vehicles creates useful group-level behavior. Vehicles carry definitions of rules of interaction on shared flyways. In conjunction with a means of exchanging location and velocity information with close neighbors, onboard algorithms calculate complementary navigation vectors that inform each vehicle's autopilot of a cooperative trajectory. The collective result of individual, autonomous decisions is cooperation at a group scale that manages traffic features such as density and spacing without the need for a ground-based communication infrastructure.

23 Claims, 17 Drawing Sheets

(51) Int. Cl.
  *G08G 5/04* (2006.01)
  *G05D 1/00* (2006.01)
  *G08G 5/00* (2006.01)

(56) References Cited

U.S. PATENT DOCUMENTS

| | | | |
|---|---|---|---|
| 7,412,324 B1* | 8/2008 | Bagge | G01C 23/00 |
| | | | 340/948 |
| 9,382,003 B2 | 7/2016 | Burema et al. | |
| 9,645,581 B1* | 5/2017 | Yang | G05D 1/101 |
| 10,037,704 B1* | 7/2018 | Myr | G08G 5/0043 |
| 2003/0004641 A1 | 1/2003 | Corwin et al. | |
| 2008/0201024 A1* | 8/2008 | Matos | G05D 1/0011 |
| | | | 701/2 |
| 2012/0209457 A1 | 8/2012 | Bushnell | |
| 2013/0046462 A1* | 2/2013 | Feyereisen | G08G 5/0021 |
| | | | 701/457 |
| 2013/0338856 A1 | 12/2013 | Yelland et al. | |
| 2015/0217870 A1* | 8/2015 | McCullough | G08G 5/0021 |
| | | | 704/275 |
| 2015/0269846 A1* | 9/2015 | De Prins | G08G 5/0043 |
| | | | 701/120 |
| 2016/0012734 A1* | 1/2016 | Bruce | G08G 5/0043 |
| | | | 701/16 |
| 2016/0117929 A1* | 4/2016 | Chan | G06Q 30/04 |
| | | | 701/3 |
| 2017/0045894 A1* | 2/2017 | Canoy | G05D 1/0676 |
| 2017/0358218 A1* | 12/2017 | Einset | G06N 99/005 |

OTHER PUBLICATIONS

William Strunk Jr. and E.B. White, The Elements of Style, 3rd Edition, all pages. (Year: 1979).*
International Search Report and Written Opinion of the International Searching Authority, dated May 31, 2018, Corresponding to PCT/US2018/023197, 7 pages.

* cited by examiner

Flyway parameters:

| | |
|---|---|
| Endpoint (x, y and z) | (e.g., 128.7564E, 37.3534N, 80 m AGL) |
| Bearing (toward endpoint) | (e.g., 56°E) |
| Inflow (45° distance) | (e.g., 100 m) |
| Flyway ID | (e.g., #230) |
| Flyway type | (e.g., 1=gas, 2=liquid, 3=solid) |
| Danger range | (e.g., 100 m) |
| Target speed | (e.g., 30 m/s) |
| Target spacing | (e.g., 200 m) |

FIG. 2

Vehicle broadcast parameters:

| | |
|---|---|
| Position (location) | (e.g., 68.2332E, 34.8978N, 66 m AGL) |
| Velocity (vector) | (e.g., 25 m/s heading 44°E, descending 0.3 m/s) |
| Vehicle ID | (e.g., #UAS-HN589) |
| Flyway ID | (e.g., #230) |
| Distance from flyway endpoint | (e.g., 4.692 km) |
| Number of close neighbors | (e.g., 5) |
| Vehicle status | (e.g., 1=normal, 2=low power, 3=emergency) |

FIG. 3

9. Using information broadcast from all neighbors within communication range, make a table of number of close NEIGHBORS versus DISTANCE from Flyway endpoint.

10. Determine the along-Flyway slope of the trend in density.

11. Adjust vehicle speed to be a certain amount faster or slower than the nominal flight speed to move the vehicle in the direction of less density within the group.

FIG. 7

9. Make an incremental adjustment to speed, either accelerating or decelerating, to tend toward the target speed for the flyway.

10. Using the distance from flyway endpoint parameters broadcast from all neighbors within communication range, determine the closest vehicle behind and the closest vehicle ahead.

11. If either of these closest vehicles are within the target spacing distance for the flyway, accelerate or decelerate another incremental amount to increase distance between the vehicle and the neighbors (note that if there are close neighbors both ahead and behind the result will be to position the vehicle equidistant from both).

FIG. 9

AUTOMATED AIR TRAFFIC CONTROL OF UNMANNED AIR VEHICLES

CROSS-REFERENCE TO RELATED APPLICATION(S)

The present application claims priority to and the benefit of U.S. Provisional Application No. 62/474,047, filed Mar. 20, 2017, entitled "AUTOMATED AIR TRAFFIC CONTROL OF UNMANNED AIR VEHICLES", the entire content of which is incorporated herein by reference.

FIELD

This disclosure relates generally to the control of multiple unmanned air vehicles, and in particular to a method and system for coordinating traffic of a plurality of unmanned air vehicles.

BACKGROUND

Mobile unmanned vehicles with autonomous capabilities are currently in development for land, water, and air applications in a variety of industries. These unmanned vehicles increasingly employ the ability to sense their surroundings to enable autonomous navigation and data collection. Unmanned air vehicles (UAVs) are increasingly tasked with performing surveillance and reconnaissance for security and disaster response, and United States regulations continue to codify the introduction of UAV drones into navigable civilian airspace for commercial and hobby purposes. The future of commercial drone usage may include dedicated airspace corridors and travel routes shared by vehicles of a variety of models; these corridors may be tightly regulated to enforce air speed and elevation limits. As the number of UAVs sharing the same travel corridors increases, greater vehicle density may contribute to complications related to higher traffic, such as impromptu slowdowns or collisions. Unmanned vehicles required to land in designated regions may find themselves competing for space with other units controlled by different operators. Dynamic systems comprised of several unmanned vehicles must be managed during deployment to ensure that appropriate group and individual behaviors, such as collision avoidance and inter-vehicle spacing, are exhibited, and that airspace regulations are complied with.

Some related art UAV autopilot systems were developed for specific applications using existing infrastructure. Crop-dusting UAVs follow predetermined lane segments over a field designated by a central control system, while self-driving car autopilots still follow static roadways. UAVs operating under "leader-follower" principles cannot set their own flight plans or modulate their speed and behavior in response to encounters with vehicles outside their swarm. A traffic control system that could scale with any number of vehicles would allow for a single solution for coordinating flight paths amongst different types and models of vehicles. An on-board UAV autopilot that can react to changes in traffic density while still abiding by limitations on speed and path dependencies can result in more efficient and safer travel corridors; this has the added benefit of obviating the need for a perpetually broadcasting centralized traffic controller. There exists a need for a method of managing automated vehicle traffic that is more safe, rapid, adaptable, and scalable while remaining platform-agnostic.

In addition to managing traffic for disparate vehicles, improvements in UAV autonomy are opening up new uses for multivehicle systems. It is anticipated that there will be an increasing need for lone operators to manage several UAV's at once. This will often occur where there is no substantial communication infrastructure, such as in a search and rescue or border surveillance operation, and/or where vehicles need to operate closely to each other, such as when they are returning to a delivery location. In these cases, there is a need for a portable traffic management solution.

SUMMARY

The present invention describes an automated air traffic control system for unmanned air vehicles (UAVs). The air traffic control system comprises distributed communications and drone autopilot software as well as management tools operable via a user interface. The system is configured to assemble a network of virtual lane segments, referred to as flyways, which may be followed by UAVs in flight. Flyway segments are defined by a plurality of parameters that dictate vehicle behavior. Said parameters may include the spacing between UAVs, and may include curved and straight paths exhibiting, or without, air speed targets.

The air traffic control system may comprise software management tools for configuring UAV flight paths prior to a flight. The management tools may be operable via a software application running on a mobile or desktop computer hardware. Said software application may comprise a Human Machine Interface (HMI) display configured to provide a user with the ability to draw and create UAV flight paths, check the validity of flight paths against existing maps and airspace restrictions, and upload them to a plurality of UAVs in network connection with said computer hardware. UAVS that receive flight path data from the air traffic control system may be further configured to update said flight paths during transit in response to sensor feedback and data signals received from proximate manned and unmanned vehicles.

UAVs may be configured with a means to sense the presence and distance from neighboring vehicles, such as through wireless communication broadcasts and reception of UAV GPS information, or with the use of proximity sensors. The UAV autopilot of the present invention may be configured with a collision avoidance feature and a traffic response feature. The collision avoidance feature may dictate fore-aft spacing between UAVs following the same flyway and the traffic response feature may modulate air flight speed to comply with flyway speed targets, maintain desired traffic densities and average traffic speeds, and to safely pass or route around vehicles obstructing their path.

Unmanned air vehicles that utilize the air traffic autopilot of the present invention maximize the airspace utilization of UAV airspace corridors by providing a means for dense swarms of disparate vehicles to exhibit harmonious group behavior. The flyway creation tools and communication architecture allows for an operator to rapidly create a custom UAV flight plan and traffic network at scales both large and small.

According to an embodiment of the present invention there is provided a method for controlling a plurality of unmanned air vehicles, the method including: defining a first flyway, the first flyway being geographically located and having a central line and an inflow pattern; acquiring, by each unmanned air vehicle, information on a position and velocity of one or more other unmanned air vehicles of the plurality of unmanned air vehicles; adjusting, by each unmanned air vehicle, a direction of travel of the unmanned air vehicle, the adjusting being in accordance with: the value of the inflow pattern at the position of the unmanned air vehicle; and the position and/or velocity of the one or more other unmanned air vehicles on the first flyway.

In one embodiment, the central line is a straight line having an endpoint and a bearing toward that endpoint.

In one embodiment, the method includes, determining, by each unmanned air vehicle on the first flyway, whether it has passed a plane that contains the endpoint and is perpendicular to the bearing of the first flyway.

In one embodiment, the method includes: defining a second flyway, the second flyway being geographically located and having a central line and an inflow pattern; and after determining, by an unmanned air vehicle of the plurality of unmanned air vehicles, that it has passed the plane: adjusting, by the unmanned air vehicle, a direction of travel of the unmanned air vehicle, the adjusting being in accordance with: the value of the inflow pattern of the second flyway at the position of the unmanned air vehicle.

In one embodiment, the method includes acquiring, by the unmanned air vehicle, information on a position and velocity of one or more other unmanned air vehicles, of the plurality of unmanned air vehicles, on the second flyway, wherein the adjusting is further in accordance with the position and/or velocity of the one or more other unmanned air vehicles on the second flyway.

In one embodiment, the central line is a curved line having: an endpoint; a constant radial distance from a center point; a direction of travel along the central line; and a bearing from the center point to the endpoint.

In one embodiment, the method includes, determining, by each unmanned air vehicle on the first flyway, whether it has passed a plane that contains the endpoint and is perpendicular to the first flyway bearing immediately preceding the endpoint.

In one embodiment, the inflow pattern is defined by an equation and a single parameter.

In one embodiment, the method includes adjusting, by the unmanned air vehicle, a speed of the unmanned air vehicle in accordance with a target speed.

In one embodiment, the adjusting is further in accordance with: a separation, between each unmanned air vehicle and another unmanned air vehicle, of the plurality of unmanned air vehicles, ahead of the unmanned air vehicle; a separation, between each unmanned air vehicle and another unmanned air vehicle, of the plurality of unmanned air vehicles, behind the unmanned air vehicle; and a target fore-aft spacing.

In one embodiment, the acquiring, by each unmanned air vehicle, of the information, includes receiving the information from the one or more other unmanned air vehicles through a common radio channel.

In one embodiment, the central line has an endpoint, and the method further includes acquiring, by each unmanned air vehicle, information on the linear distance from the endpoint, along the central line, of the one or more other unmanned air vehicles.

In one embodiment, an unmanned air vehicle, of the one or more other unmanned air vehicles, is on a flyway having an identifier, and the method further includes acquiring, by another unmanned air vehicle of the plurality of unmanned air vehicles, the identifier.

In one embodiment, the method includes: calculating, by a first unmanned air vehicle on the first flyway, of the plurality of unmanned air vehicles, a first local vehicle density; calculating, by a second unmanned air vehicle on the first flyway, of the plurality of unmanned air vehicles, a second local vehicle density; and acquiring, by a third unmanned air vehicle on the first flyway, of the plurality of unmanned air vehicles, the first local vehicle density and the second local vehicle density.

In one embodiment, the method includes: calculating, by the third unmanned air vehicle, a density slope from the first local vehicle density and the second local vehicle density; and adjusting, by the third unmanned air vehicle, a speed of the unmanned air vehicle, the adjusting being in accordance with the density slope.

In one embodiment, the adjusting includes: determining, for each of a plurality of neighboring vehicles, of the one or more other unmanned air vehicles, for which an extrapolated nearness is less than a threshold, a collision avoidance yaw angle; and forming a sum of the collision avoidance yaw angles.

In one embodiment, the adjusting further includes: adding to the sum of the collision avoidance yaw angles an inflow field yaw angle, to form a total yaw angle; and multiplying the total yaw angle by a set factor to form a target yaw rate.

In one embodiment, the method includes acquiring, by each unmanned air vehicle, an identifier of one or more respective flyways being used by the one or more other unmanned air vehicles, wherein the forming of the sum of the collision avoidance yaw angles includes forming a weighted sum of the collision avoidance yaw angles, the weighted sum having a smaller weight for an unmanned air vehicle on the first flyway as the unmanned air vehicle than for an unmanned air vehicle not on the first flyway.

In one embodiment, the adjusting further includes: adding to the sum of the collision avoidance yaw angles an inflow field yaw angle, to form a total yaw angle; multiplying the total yaw angle by a set factor to form a target yaw rate; reducing the magnitude of the target yaw rate to a maximum vehicle yaw rate, when the magnitude of the target yaw rate exceeds the maximum vehicle yaw rate.

In one embodiment, the defining of the first flyway comprises defining the first flyway by a user device, and the user device includes a human machine interface and being configured to receive user input for parameters of the first flyway.

In one embodiment, the user device includes a graphical user interface for: displaying existing flyways to a user, and receiving, from the user, parameters of flyways to be added.

In one embodiment, the user device is configured: to receive, from the user, a sequence of flyways, and to determine whether the sequence is valid.

In one embodiment, each unmanned air vehicle includes: an autopilot circuit for receiving guidance commands and controlling flight actuators of the unmanned air vehicle; and a navigation circuit, the navigation circuit being in a peripheral device separate from the autopilot circuit, and the acquiring of the information includes acquiring the information by the navigation circuit, and the adjusting of the direction includes: calculating the direction by the navigation circuit; and sending the calculated direction to the autopilot circuit by the navigation circuit as part of a guidance command.

According to an embodiment of the present invention there is provided a system, including a plurality of unmanned air vehicles, and defining a first flyway, the first flyway being geographically located and having a central line and an inflow pattern, an unmanned air vehicle of the plurality of unmanned air vehicles including a processing circuit configured to: acquire information on a position and velocity of one or more other unmanned air vehicles of the plurality of unmanned air vehicles; calculate an adjusted direction of travel of the unmanned air vehicle, the calculation being in accordance with: the value of the inflow pattern at the position of the unmanned air vehicle; and the position and/or velocity of the one or more other unmanned air vehicles on the first flyway.

According to an embodiment of the present invention there is provided a peripheral device including a processing circuit configured to: be connected to an autopilot circuit of an unmanned air vehicle of a plurality of unmanned air vehicles; store parameters defining a first flyway, the first flyway being geographically located and having a central line and an inflow pattern; receive information on a position and velocity of one or more other unmanned air vehicles of the plurality of unmanned air vehicles; calculate an adjusted direction of travel of the unmanned air vehicle, the calculation being in accordance with: the value of the inflow pattern at the position of the unmanned air vehicle; and the position and/or velocity of the one or more other unmanned air vehicles on the first flyway.

BRIEF DESCRIPTION OF THE DRAWINGS

These and other features and advantages of the present invention will be appreciated and understood with reference to the specification, claims, and appended drawings wherein:

FIG. 2 is a list of parameters that define a flyway, according to an embodiment of the present invention;

FIG. 3 is a list of parameters that are broadcast from a vehicle in flight, according to an embodiment of the present invention;

FIG. 7 is a flowchart of additional steps in a liquid-type algorithm, according to an embodiment of the present invention;

FIG. 9 is a flowchart of additional steps in a solid-type algorithm, according to an embodiment of the present invention;

DETAILED DESCRIPTION

The detailed description set forth below in connection with the appended drawings is intended as a description of exemplary embodiments of a method and system for automated air traffic management of unmanned vehicles provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Some embodiments include three components: a system of flyways, a means for communication between UAVs (or simply "vehicles"), and algorithms for onboard computation of trajectories that can be fed to each vehicle's autopilot.

Figure 1A:
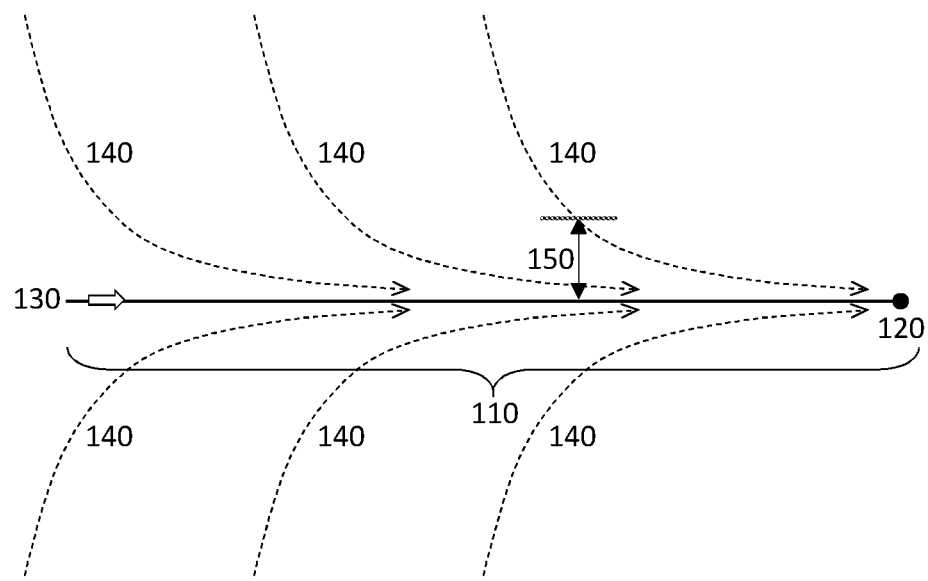
FIG. 1A is a map view of spatial components of a flyway, according to an embodiment of the present invention.

A flyway is virtual feature comprising spatial parameters and behavioral parameters. The spatial parameters (shown in 2-dimensional map view in FIG. 1) of a flyway (110) include a geographically defined endpoint (120), a bearing line (130) (or "central line") pointing toward and intersecting with the endpoint, and a 3-dimensional inflow pattern (140) around the bearing line.

The inflow pattern (140) may be a laminar (non-crossing) vector field that can be used by a UAV anywhere in the airspace to identify a navigation vector that will bring the UAV closer to and aligned with the flyway bearing line. Although in some examples herein the inflow pattern is described as a vector field, in general an "inflow pattern" is lexicographically defined as any function that takes a distance as an argument and returns an angle.

In one embodiment the bearing line is horizontal (i.e. the altitude of the bearing line is constant along its length). The horizontal (map view) component of the inflow pattern around a flyway can be defined by a single inflow parameter (150), which is the distance at which the inflow angle is 45° from the flyway bearing. If D is the ratio between the perpendicular distance in the horizontal direction from the flyway bearing line and the inflow parameter (150), then the following equation can be used in map view to define the entire 2-dimensional field of inflow vectors:

$$\text{Inflow vector bearing} = \text{Flyway bearing} + (90°*(D/(1+|D|)))$$

An alternate equation that yields a similar inflow pattern uses the hyperbolic tangent (tan h) function:

$$\text{Inflow vector bearing} = \text{Flyway bearing} + (90°*\tan h(0.55*D))$$

Figure 1B:
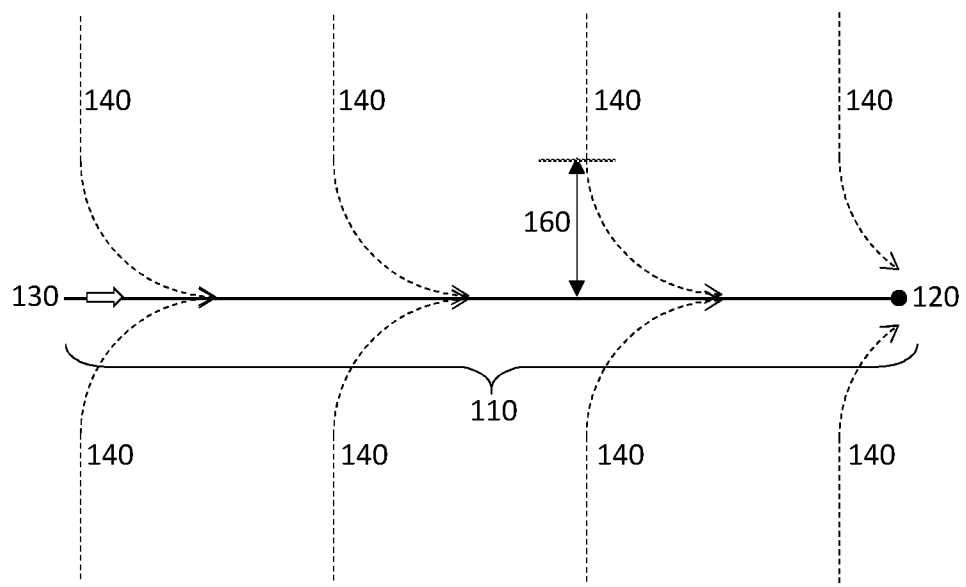
FIG. 1B is a map view of spatial components of a flyway, according to an embodiment of the present invention.

A third alternative, shown in FIG. 1B, uses a single inflow parameter (160) to define two regions. For the space horizontally farther from the bearing line than the inflow parameter, the inflow pattern is perpendicular to the bearing line and points toward it. For the space horizontally closer than the inflow parameter (160), if D is the ratio between the perpendicular distance in the horizontal direction from the flyway bearing line and the inflow parameter (160), then the following equation can be used:

Inflow vector bearing=Flyway bearing+arcsine($D$)

The vertical component (not shown) of the inflow pattern can be defined by a constant slope upwards, for positions beneath the bearing line, or downwards, for positions above the bearing line. Note that in most subsequent figures the flyway (110) is shown as just the endpoint (120) and bearing line (130), but the inflow pattern (140) is always implied.

FIG. 2 lists the parameters, both spatial and behavioral, that can define a flyway. The list includes the three parameters already discussed (endpoint 120, bearing 130, inflow pattern 150 or 160), plus the additional parameters to help manage the behavior of any UAV operating under the definition of the flyway. In flight, a UAV uses some or all of these flyway parameters while running an on-board algorithm to determine its trajectory (described below). In some embodiments the flyways are not constrained to be horizontal, and the parameters defining the flyways are adjusted accordingly (e.g., by including a parameter specifying the slope of the bearing line).

The behavioral parameters govern the behavior of a UAV traveling along the flyway, either with respect to its own progress along the flyway or with respect to other UAVs sharing the flyway. The flyway ID may be used by a vehicle following a sequence off flyways (as described in further detail below) to track which one it is on. The flyway type (described below) informs the vehicle as to which on-board algorithm to use to create certain group behaviors. The target speed and target spacing are guides utilized for certain algorithms of flyways (described below).

The second component of some embodiments is a means to rapidly communicate information between nearby vehicles that can be used for adjusting behavior within a group of vehicles utilizing the same flyway. In one embodiment all vehicles would be equipped with radios that send and receive on the same, single frequency (e.g. a channel in the 2.4 GHz band). Much like the Automatic Dependent Surveillance—Broadcast (ADS-B) system being implemented for manned aircraft, vehicles can transmit small radio packets several times a second that contain the key information, referred to as vehicle parameters, shown in FIG. 3. These packets can comprise the entire set of vehicle-to-vehicle communication, or V2V communication, needed to provide each vehicle with neighbor awareness. Position, velocity and vehicle ID may be used to track neighbor movement. Flyway ID is important for knowing if neighbors are on the same flyway so that a vehicle can determine if cooperative algorithms apply. A minimum safe distance, or danger range, is included as one of the flyway parameters so all vehicles have a similar definition of a safe distance to pass each other. Distance from flyway endpoint and number of close neighbors are parameters used in some of the automated management behaviors described below. And vehicle status can be helpful in determining whether to use the standard rules of the flyway or whether a neighbor should receive special treatment, e.g. keeping a larger separation distance from a vehicle in "emergency" mode.

The remainder of the discussion assumes these vehicle parameters are being transmitted in radio packets, but this does not mean to imply that this is the only embodiment to receive neighbor information. For example, as computer vision systems become more capable much or all of this information could be determined through direct observation, particularly if neighbor vehicles had a few beacon lights showing status or a color code for a particular flyway.

Figure 4:
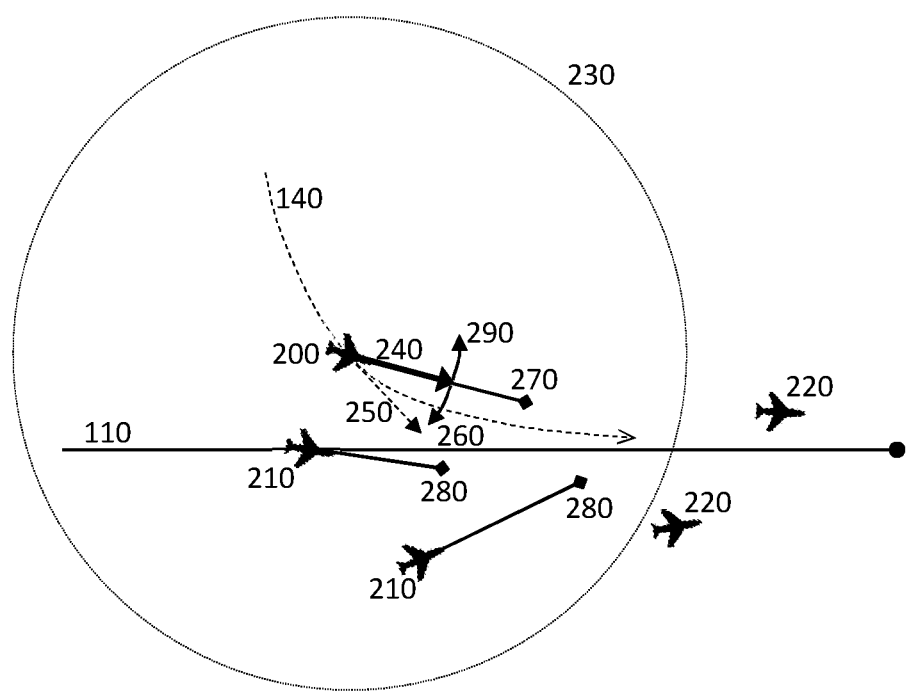
FIG. 4 is a map view of navigational components used by a vehicle on a flyway, according to an embodiment of the present invention.

The third component of some embodiments is a set of algorithms for onboard computation of a vector that can be delivered to a vehicle's autopilot that assures cooperative behavior within the group while maintaining the flow of traffic. The elements of one such algorithm are shown graphically in FIG. 4 and outlined in a flow chart in FIG. 5. In the most general example, the updated vector represents the same velocity as the vehicle had before the update. The primary purpose of the algorithm is to generate a yaw adjustment to follow the flyway while avoiding collision, and to do this without having to alter the vehicle speed. In some embodiments the sum of act 7 of FIG. 5 (in which all collision avoidance yaw angles are summed to determine a final collision avoidance yaw angle) is a weighted sum, with, for example, the collision avoidance yaw angle corresponding to any vehicle that is on a different flyway (from the vehicle performing the calculation) being weighted more heavily. Such a weighting may be used to take into account that vehicles on the same flyway will tend to follow the same inflow pattern and may therefore be at lower risk of colliding.

In practice, due to its own maneuverability limits, any vehicle traveling forward will have a limit to its instantaneous yaw rate, e.g. 30°/second. This yaw rate may be different for different vehicles. Also, it may vary for the same vehicle when it is travelling at different speeds. In some embodiments it may be helpful to take yaw rate limitations into account. One method for doing this is to use the same sequence of calculations as in FIG. 5 but replace "yaw angle" with "yaw rate", and in the algorithm treat this yaw rate as a value limited by individual vehicle performance.

Figure 5:
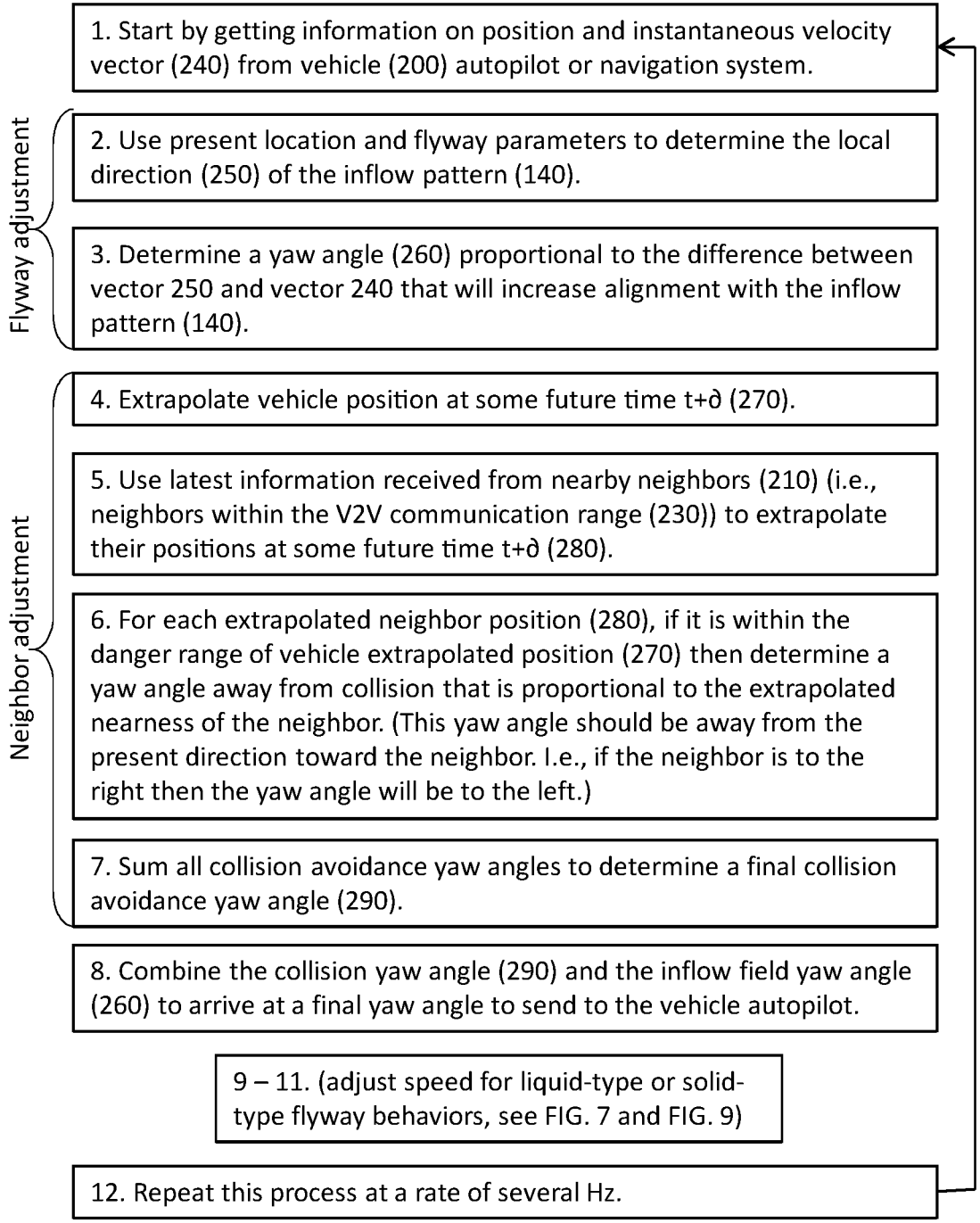
FIG. 5 is a flowchart of steps in a gas-type algorithm, according to an embodiment of the present invention.

In this case, act 3 of FIG. 5 would be modified to output a yaw rate proportional to the difference between the vehicle's instantaneous velocity vector (240) and the local bearing of the inflow pattern (250). Also, the absolute value of this yaw rate would be capped by the limits of the vehicle. Likewise, act 6 of FIG. 5 would output yaw rates subject to the same cap. Also, when acts 7 and 8 of FIG. 5 are taken the yaw rate cap is again applied in each step. In this way, regardless of how many inflow alignment or collision avoidance inputs there are, the final yaw rate sent to the vehicle autopilot will be within the capability of the vehicle to achieve. Equivalently, a final yaw angle may be calculated as described in FIG. 5, act 8. This final yaw angle may then be multiplied by a preset constant to form a target yaw rate, which may be capped by the limits of the vehicle (i.e., reduced (if it exceeds the maximum yaw rate of the vehicle) to the maximum yaw rate of the vehicle), and sent to the autopilot.

Figure 6:
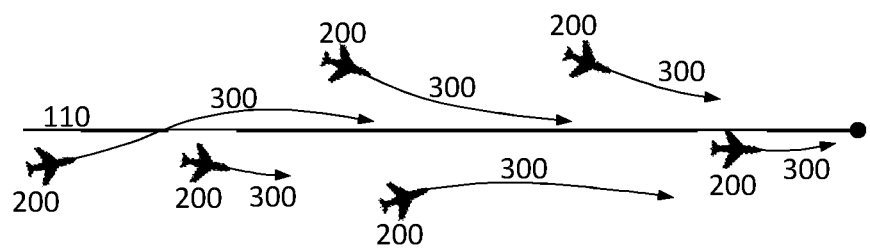
FIG. 6 is a map view of group vehicle behavior on a gas-type flyway, according to an embodiment of the present invention.

FIG. 6 shows an example of the group behavior when each vehicle on a flyway is using this same algorithm. Each vehicle has its own nominal speed, the airspeed at which it is programmed to travel when flying alone. Note that vehicles traveling at different speeds (represented by the length of their trajectory vectors (300)) are able to coexist along the flyway, passing as needed, so they are free to maintain their nominal speeds. Because the vehicles all have independent speeds within the shared space of the flyway this algorithm is referred to as a gas-type algorithm.

Imposing a few additional rules can dramatically impact the group behavior. Two useful algorithms described next include one, referred to as a liquid-type algorithm, that involves evening the general density, and one, referred to as solid-type algorithm, that involves assembling into single file.

Figure 8:
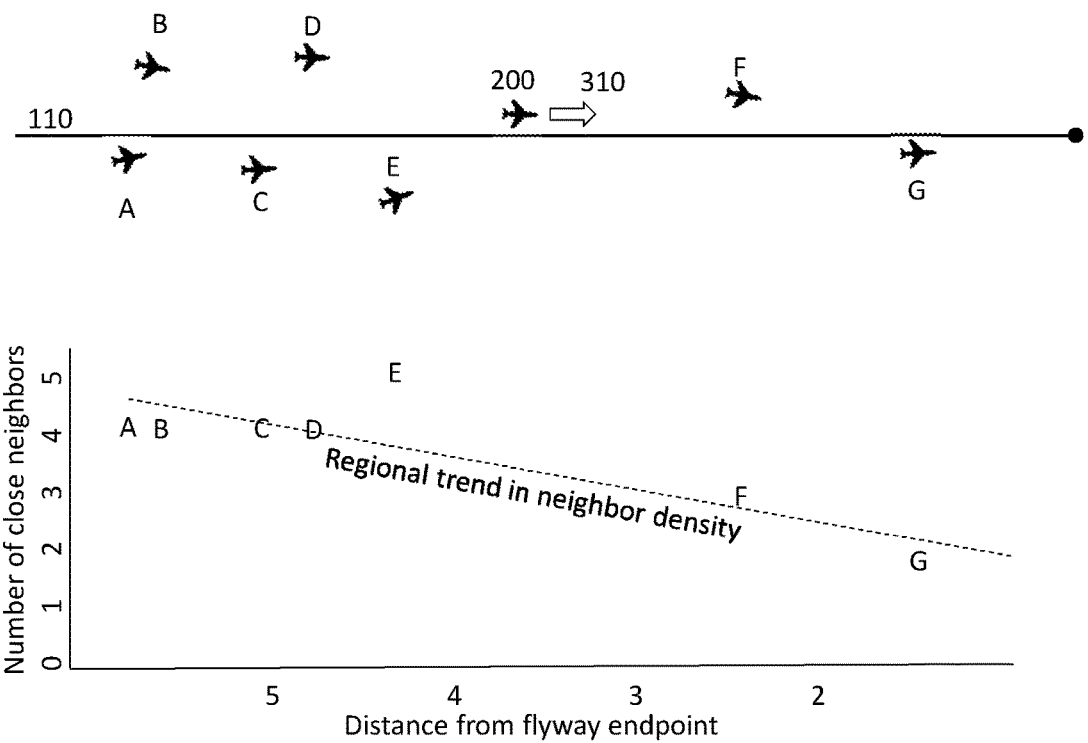
FIG. 8 is a map view of group vehicle behavior on a liquid-type flyway, according to an embodiment of the present invention.

FIG. 7 and FIG. 8 show the flowchart and resultant behavior for vehicles operating according to a liquid-type algorithm on a shared flyway. The yaw calculations for the liquid-type algorithm are the same as the gas-type algorithm (FIG. 5), but it also includes a speed adjustment for each vehicle based on the along-flyway trend in the number of close neighbors (neighbor density). One vehicle parameter that each vehicle broadcasts is the distance from flyway endpoint. This is the linear distance along the bearing line between the flyway endpoint and a plane passing through the vehicle that is perpendicular to the bearing line. Each vehicle may also calculate and broadcast an estimated density of other vehicles at the vehicle (which may be calculated, for example, as the number of other vehicles within a set radius (e.g., a communication range) of the vehicle). Each vehicle may then receive the respective estimated densities from other vehicles on the flyway, and calculate a regional trend in neighbor density (e.g., using a linear fit, as illustrated in FIG. 8).

The purpose of the liquid-type algorithm is to decrease areas of higher vehicle density along the flyway, while still permitting individual vehicles to pass each other if their nominal speeds are very different. The speed adjustment is a shift away from the nominal speed proportional to the local trend in neighbor density. For example, if a vehicle (200) determines (e.g., using a linear fit, as illustrated in FIG. 8) that the trend in neighbor density is decreasing toward the endpoint at a rate of one vehicle per kilometer, the liquid-type algorithm may instruct that vehicle to accelerate to 110% of its nominal speed (310).

In another embodiment, a vehicle may simply use its own local density, and that of its closest neighbor fore or aft, to determine a density slope for the speed adjustment.

Figure 10:
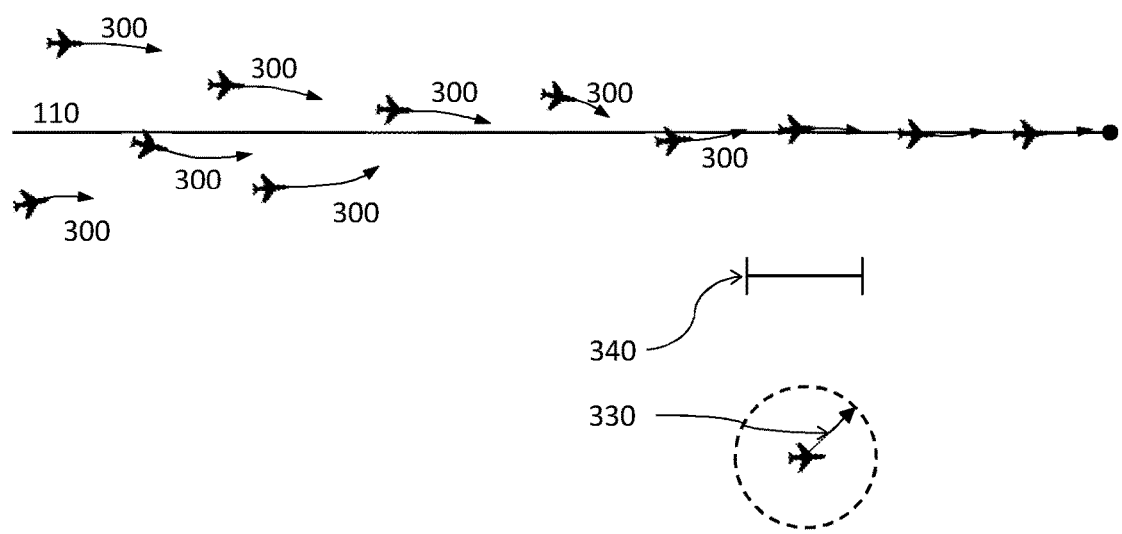
FIG. 10 is a map view of group vehicle behavior on a solid-type flyway, according to an embodiment of the present invention.

FIG. 9 and FIG. 10 show the flowchart and resultant behavior for vehicles operating under solid-type algorithm on a common flyway. As vehicles progress along this type of flyway they will tend toward a uniform speed (the target speed) and tend toward at least a minimum spacing (based on target spacing (340)). If the along-flyway spacing is greater than the danger range (330), the vehicles will coalesce in line with the flyway (110). This sort of lining up behavior, created entirely through each vehicle independently running the solid-type algorithm, can be useful for vehicles approaching a landing zone or needing to fly through a tight flight corridor.

Figure 11:
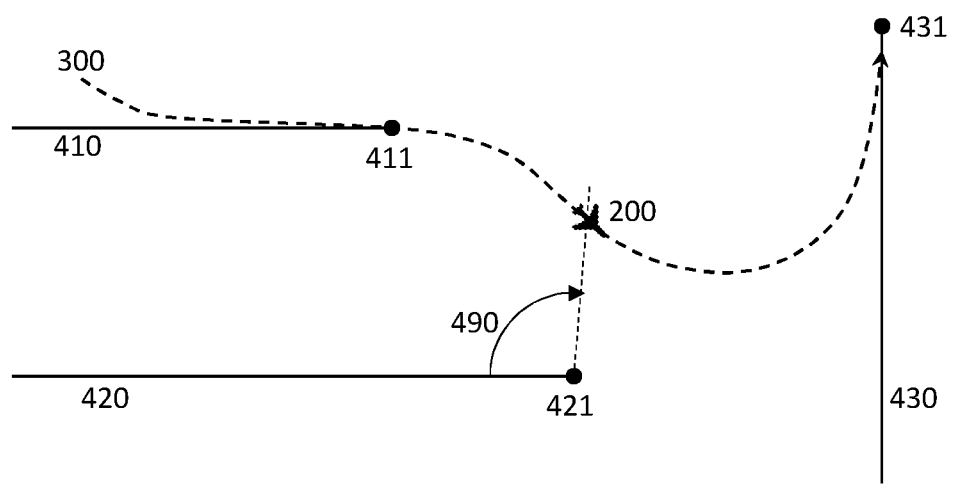
FIG. 11 is a map view of a vehicle following a sequence of flyways, according to an embodiment of the present invention.

FIG. 11 is a map view showing a vehicle (200) following a flight plan, according to some embodiments. A flight plan consists of, or includes, a sequence of flyways. The parameters defining each flyway are carried on the vehicle, along with a list of the sequence in which to follow the flyways. The sequence can be a preset list, or it can be a list that alters based on active in-flight choices, such as switching to a particular flyway when flight battery level falls below a certain threshold. In FIG. 11 the sequence of flyways is 410 to 420 to 430, and their respective endpoints are 411, 421 and 431.

FIG. 11 demonstrates the function of a flyway endpoint. The lone vehicle on this flight plan will follow the path 300. First the vehicle follows the inflow pattern of 410, passes through the endpoint 411, and begins to yaw toward the inflow pattern of 420. As a result of maintaining speed, and because crowding may prevent a vehicle from nearing the centerline of a flyway, the endpoint cannot be treated as a typical waypoint. I.e., in following a flight plan, vehicles are not expected to reach the endpoint within any pre-set distance. Instead, the endpoint is used to define a point on a 2-dimensional plane perpendicular to the flyway. The end of the flyway is reached whenever a vehicle passes through that plane. A vehicle on a flight plan is constantly checking whether it has passed the endpoint of the flyway it is following. The test can be carried out as part of the algorithm by monitoring the angle (490) between the bearing from the vehicle (200) toward the endpoint (421) and the bearing of the flyway (420). If that angle exceeds 90° the vehicle switches to the next flyway in its sequence. In the case of FIG. 11, the next flyway is 430 and the vehicle yaws left to align with the new inflow pattern.

FIG. 11 also serves to highlight the fact that flyways do not need to intersect or connect to each other. The virtual field of the inflow pattern defined by a flyway stretches indefinitely. A vehicle can be "on a flyway" even when it is far from the bearing line. This assures that any vehicle under guidance of a flyway flight plan is always aligning with a predictable navigation field.

Figure 12:
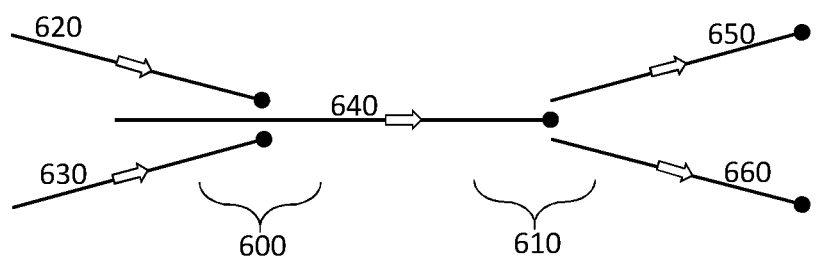
FIG. 12 is a map view of flyway intersection configurations, according to an embodiment of the present invention.

FIG. 12 shows two simple intersection patterns that can be produced with flyways, a merge (600) and a branch (610). The complete list of flyways (620, 630, 640, 650 and 660) could be carried on all vehicles within a system, but vehicles can have flight plans that only use a subset of the flyways in their sequences. E.g., one vehicle can travel from 620 to 640 to 660 while a second vehicle travels from 630 to 640 to 650. If these two vehicles are following flyway 640 at the same time their flight paths could conflict as they reach the branch intersection. One way to make vehicles self-manage their interactions to assist with this crossover is to designate the middle portion (640) as a flyway on which to use a solid-type algorithm. As demonstrated in FIG. 10, the vehicles will create a safe fore-aft distance, greater than the danger range, that will then let them cross safely.

Figure 13A:
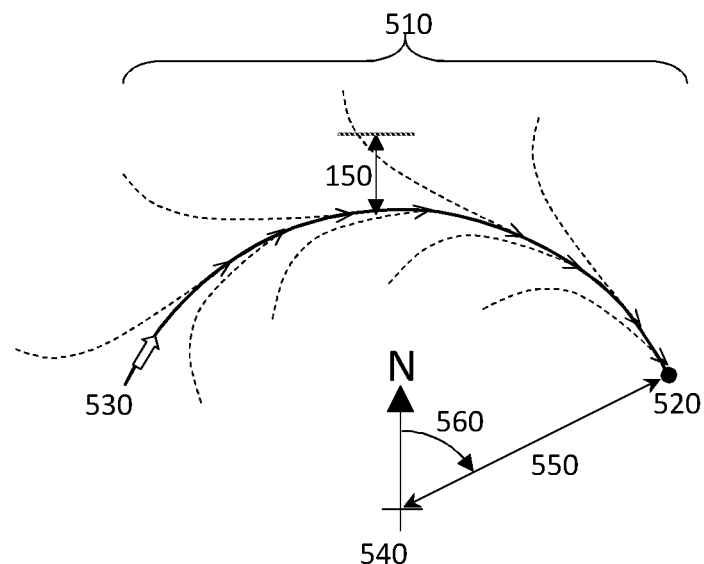
FIG. 13A is a map view of spatial components of an arc flyway, according to an embodiment of the present invention.
Figure 13B:
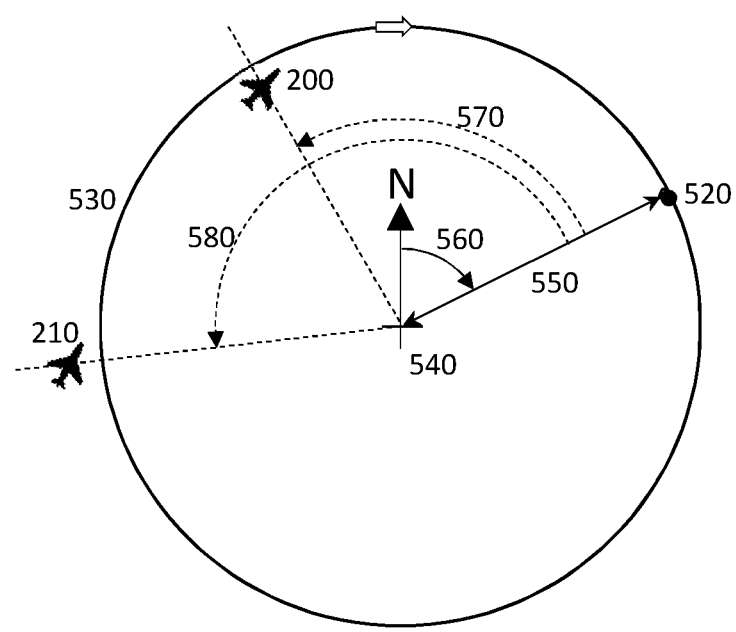
FIG. 13B is a map view of spatial components of an arc flyway, according to an embodiment of the present invention.

In addition to the linear flyways described so far, another useful version of the flyway is an arc, shown in horizontal map view in FIG. 13. In one embodiment (FIG. 13A) the spatial parameters of an arc flyway (510) include an endpoint (520) and a constantly curving line (530). The geographic location of the arc flyway is defined by the X, Y and Z coordinates (X, Y, Z; or latitude, longitude, altitude) of the centerpoint (540). The arc flyway can be defined as a line of constant distance or radius (550) from the centerpoint (540). The endpoint (520) for the arc flyway can be defined by an angle from due north (560), and the direction of this angle can indicate the direction of travel along the arc flyway. E.g., 60° east means travel is clockwise in map view. Similar to the linear flyway, the arc flyway also includes the spatial parameter of an inflow pattern that can be defined by a single inflow parameter (150). Depending on where vehicles join and leave an arc flyway, it can be envisioned as a portion of a circle, as in FIG. 13A, or as a complete circle, as in FIG. 13B.

The same algorithms for gas-type, liquid-type and solid-type behavior can be applied by vehicles following an arc flyway. The only differences are that the arc needs a few more parameters (just described) to define it, and that there is an additional option for determining the "distance from flyway endpoint" parameter. Distance from flyway endpoint can either be reported as linear distance along the arc (530) from the endpoint (520) to where a line from the centerpoint (540) through the vehicle (200) crosses the arc, or it can be reported as an angle from the flyway endpoint (570).

Angle from the flyway endpoint can be used for the same algorithmic functions as in a linear flyway. A vehicle can keep track of when it passes the endpoint of an arc flyway by monitoring when the angle from the flyway endpoint changes from a very small number (say less than 10°) to a very large number (say greater than 350°). At this point it has reached the end of the arc flyway and can transition to the next flyway in a flight plan sequence. Also, because a vehicle can use its knowledge of the radius and angle from the flyway endpoint to compute a linear distance from the flyway endpoint, it can carry out standard instructions for adjusting speed when running the liquid-type or solid-type algorithms.

One useful application of a solid-type arc flyway is to uniformly space a random number of vehicles in a constant circular loiter pattern. To maintain a loiter, the flight plan instructs each vehicle to repeat following the same arc flyway every time it reaches the endpoint, until some other condition occurs such as a low-battery warning or an external instruction to switch to a new flyway. The solid-type algorithm includes a target speed and a target spacing. Rather than use the difference in distance from flyway endpoint between vehicles, the target spacing on an arc flyway can be defined as a difference in the angle from the flyway endpoint. As discussed above, vehicles within the target spacing distance fore-aft along a linear flyway will tend to position themselves equidistant between their close neighbors. If the target spacing on an arc flyway is defined to be 180°, then if there are only two vehicles sharing the flyway, and if they are close enough to be in V2V communication range, they will tend toward opposite sides of the flyway. For example, if these parameters are applied to the case in FIG. 13B, vehicle 200 will speed up and vehicle 210 will slow down until the difference in angle from flyway endpoint (580 minus 570) is 180°. If additional vehicles are added they will all tend toward equidistant spacing around the arc flyway. In this way a group of any number can self-manage to achieve an equal spacing.

Figure 14:
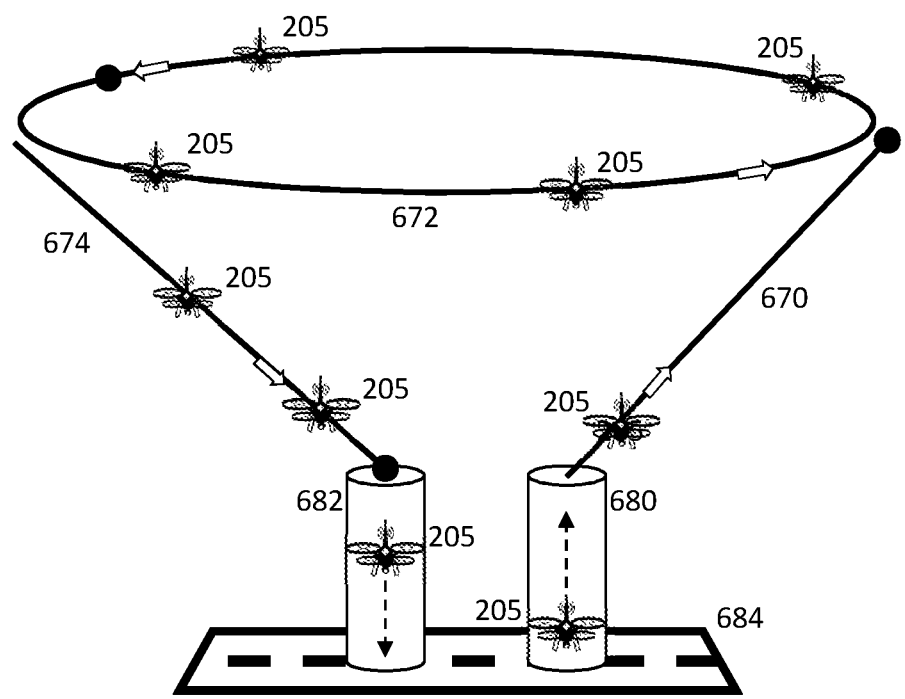
FIG. 14 is a perspective view of a multi-vehicle operation using flyways, according to an embodiment of the present invention.

FIG. 14 is a perspective view of a full operation, according to some embodiments, to manage traffic for a continuous drone operation. The purpose of the operation is to maintain a continuous multi-drone presence in an area while individual drones are swapped out for recharging or new batteries. The operation is run from a launch/land area on the ground (684). Two locations in this area correspond to a vertical launch zone (680) and a vertical landing zone (682). These two vertical zones are where ground personnel can retrieve low-battery vehicles and launch fully charged vehicles. The vertical zones reach up to the flyway system that includes three flyways: 670 is a gas-type linear flyway leading to the multi-drone loop. 672 is a solid-type arc flyway. 674 is a solid-type linear flyway. Although it may not necessarily be clear from the perspective view of FIG. 14, in the embodiment of FIG. 14 all of the flyways are horizontal.

The self-management of vehicles on the flyways means that the operator can launch drones whenever they are ready, where each individual drone is pre-programmed to travel upward to the top of the vertical launch zone (680) and then begin on its flyway sequence. The sequence begins with the drone running the gas-type algorithm following the parameters of flyway 670. When a drone reaches the endpoint of 670 it switches to the solid-type algorithm using the parameters of flyway 672, which it will repeat until its battery registers below some threshold. At this point it will run the solid-type algorithm and the parameters for flyway 674. On 674, because the rules of the solid-type algorithm cause vehicles to self-assemble into a line, drones will arrive at the top of the vertical landing zone (682) one at a time, where they can follow a pre-programmed descent to the ground (684). Here an operator can retrieve each vehicle as it lands, making room for the next one.

The method described in the discussion of FIGS. 1-14 above can be implemented as a system with the following components: 1) a computer running flyway generating software, and 2) a peripheral device attached to the autopilot of each vehicle that carries the flyway parameters, sequences, and V2V communication hardware.

Figure 15:
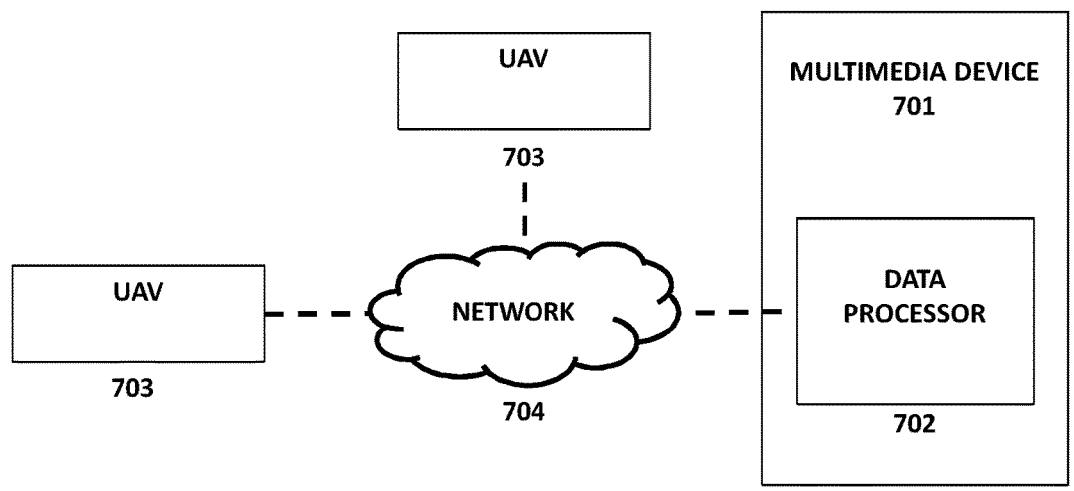
FIG. 15 is a diagram of a flyway programming system, according to an embodiment of the present invention.

The UAV air traffic control system of some embodiments includes communications architecture, distributed software, and management tools, the elements of which are illustrated in FIG. 15. A multimedia device 701 (or "user device"), such as a desktop computer, tablet, or mobile phone, may be configured with a data processor 702 (e.g., a processing circuit) running flight path generation software. Said flight path generation software may have a human machine interface (HMI) configured to allow a user to create a flight path from a plurality of flyways having defined parameters. The flight path data may be uploaded to UAVs 703 prior to, or during, a flight task over a wireless network 704. The wireless network may include radio signals, wireless internet connections, or cell messaging services. Communication bandwidth may be modulated by the autopilot in response to changes in UAV traffic density. Each UAV may have an on-board memory having a list of flight paths that form its flight plan, and an on-board processor running autopilot software. Said autopilot software may repeatedly calculate solutions to navigation algorithms to direct the UAV along a flight path.

Flight paths may be manually input by a user via the HMI on the multimedia device and uploaded to one or more UAVs or they may be automatically selected by a UAV during flight in response to various conditions. A user of the flight path generation software may save created flight paths or search for, and select, a saved flight path. A user may also utilize the path generation software to view updated weather or airspace information. The flight path generation software may be configured to check the validity of newly created flight paths and to inform the user when a flight path that has been created is invalid and why it cannot be followed by a UAV.

Figure 16A:
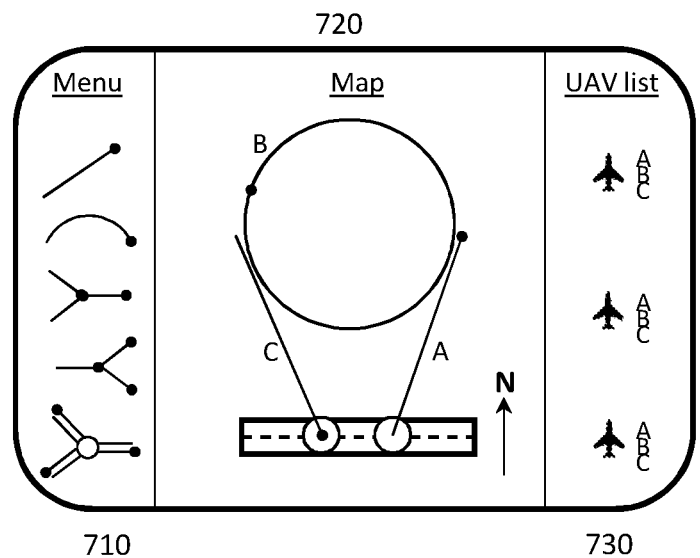
FIG. 16A shows components for creating and uploading flight plans, according to an embodiment of the present invention.

FIG. 16A shows the screen of an HMI with software for building a flyway system like the one described in FIG. 14. Using a menu of flyway types (710), an operator can build a complete flyway system on a map-based Graphical User Interface (GUI) (720). Flyway sequences, each of which uses all or a subset of the complete flyway list, can be specified for a number of different vehicles, which may be displayed in a UAV list (730). The HMI software can check for the validity of the sequences (e.g., whether the endpoint for a flyway in a sequence is located where, when a vehicle reaches the endpoint, the angle 490 (FIG. 11) for the next flyway in the sequence already exceeds 90°). The GUI can also display information of flight restrictions such as "NO FLY" zones that the operator should avoid.

Figure 16B:
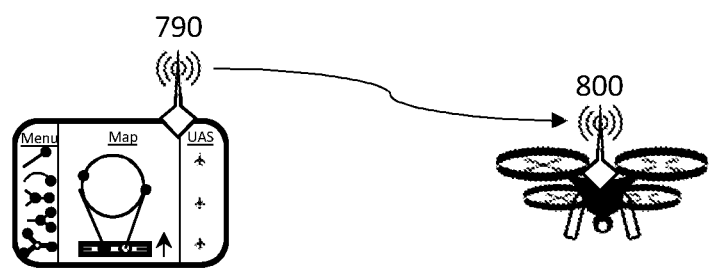
FIG. 16B shows components for creating and uploading flight plans, according to an embodiment of the present invention.

The HMI can also be equipped with a radio transmitter (790) that can communicate with peripheral devices 800 (FIG. 16B) attached to vehicles to individually upload flyway parameters and sequences.

Figure 17:
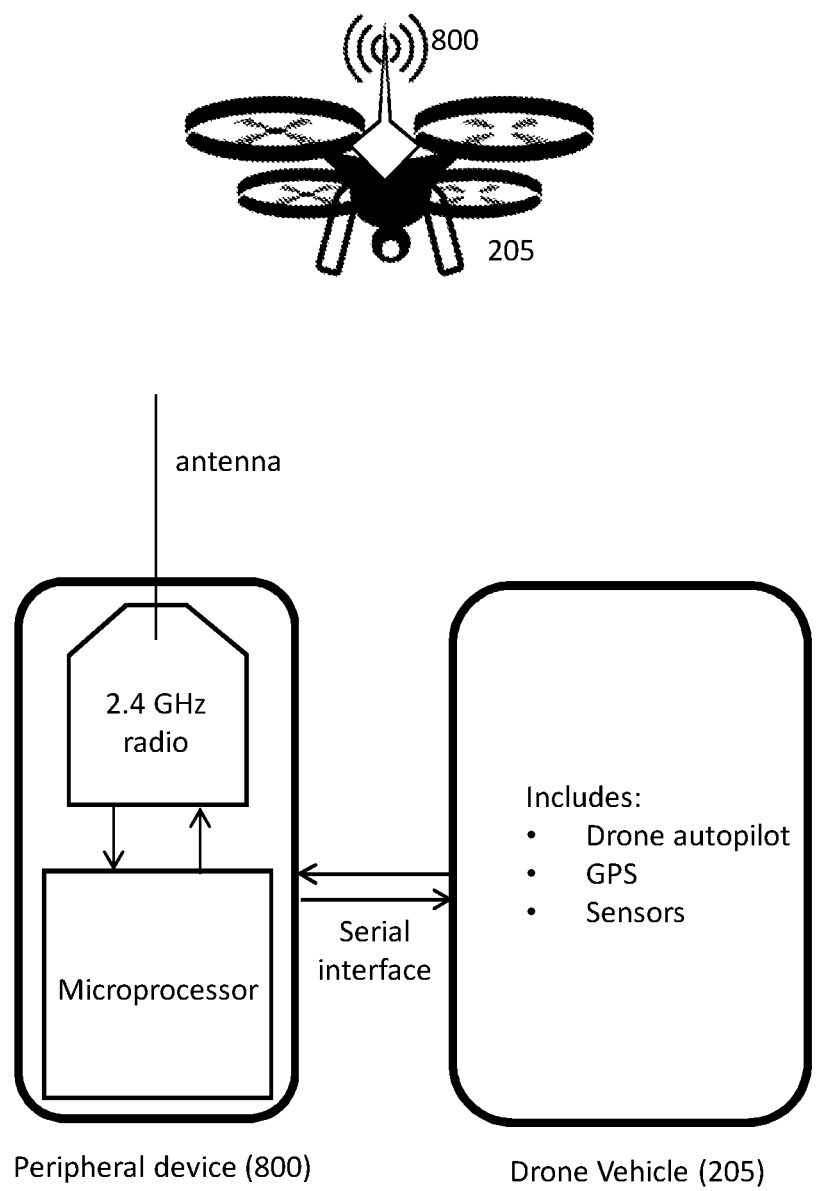
FIG. 17 shows components of the on-board system for flyway navigation, according to an embodiment of the present invention.

FIG. 17 shows the components of a peripheral device (800), that can be affixed to a vehicle (205) and provide all the on-board capabilities for flyway traffic management. The peripheral device contains a radio, a microprocessor, software to run on-board flyway algorithms, and a serial interface with the vehicle autopilot. The peripheral device can interface solely with the vehicle autopilot, or it can interface with individual sensors, such as a global positioning device (GPS) or compass, to acquire critical navigation information. In one embodiment the peripheral device uses a single-channel 2.4 GHz radio for V2V communication.

Although some embodiments are described in the context of UAVs, the invention is not limited to such applications, and some embodiments may be used, for example, with vehicles navigating on the surface, or under the surface, of a body of water, or with land vehicles in open terrain (i.e., not constrained to travel on roadways).

Calculations and other data processing operations may be performed in a UAV or in a user device by a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a method and system for automated air traffic management of unmanned vehicles have been specifically described and illustrated herein, many modifications and variations will be apparent to those skilled in the art. Accordingly, it is to be understood that a method and system for automated air traffic management of unmanned vehicles constructed according to principles of this invention may be embodied other than as specifically described herein. The invention is also defined in the following claims, and equivalents thereof.

What is claimed is:

1. A method for controlling a plurality of unmanned air vehicles, the method comprising:
defining a first flyway, the first flyway being geographically located and having a central line and an inflow pattern;
acquiring, by each unmanned air vehicle, information on a position and velocity of one or more other unmanned air vehicles of the plurality of unmanned air vehicles;
adjusting, by each unmanned air vehicle, a direction of travel of the unmanned air vehicle, the adjusting being in accordance with:
a value of the inflow pattern at the position of the unmanned air vehicle; and
the position, or the velocity, or both the position and the velocity, of the one or more other unmanned air vehicles on the first flyway.

2. The method of claim 1, wherein the central line is a straight line having an endpoint and a bearing toward that endpoint.

3. The method of claim 2, further comprising, determining, by each unmanned air vehicle on the first flyway, whether it has passed a plane that contains the endpoint and is perpendicular to the bearing of the first flyway.

4. The method of claim 3, further comprising:
defining a second flyway, the second flyway being geographically located and having a central line and an inflow pattern; and
after determining, by an unmanned air vehicle of the plurality of unmanned air vehicles, that it has passed the plane:
adjusting, by the unmanned air vehicle, a direction of travel of the unmanned air vehicle, the adjusting being in accordance with:
the value of the inflow pattern of the second flyway at the position of the unmanned air vehicle.

5. The method of claim 4, further comprising acquiring, by the unmanned air vehicle, information on a position and velocity of one or more other unmanned air vehicles, of the plurality of unmanned air vehicles, on the second flyway,
wherein the adjusting is further in accordance with the position, or the velocity, or both the position and the velocity, of the one or more other unmanned air vehicles on the second flyway.

6. The method of claim 1, wherein the central line is a curved line having:
an endpoint;
a constant radial distance from a center point;
a direction of travel along the central line; and
a bearing from the center point to the endpoint.

7. The method of claim 6, further comprising, determining, by each unmanned air vehicle on the first flyway, whether it has passed a plane that contains the endpoint and is perpendicular to the first flyway bearing immediately preceding the endpoint.

8. The method of claim 1, wherein the inflow pattern is defined by an equation and a single parameter.

9. The method of claim 1, further comprising adjusting, by the unmanned air vehicle, a speed of the unmanned air vehicle in accordance with a target speed.

10. The method of claim 9, wherein the adjusting is further in accordance with:
a separation, between each unmanned air vehicle and another unmanned air vehicle, of the plurality of unmanned air vehicles, ahead of the unmanned air vehicle;
a separation, between each unmanned air vehicle and another unmanned air vehicle, of the plurality of unmanned air vehicles, behind the unmanned air vehicle; and
a target fore-aft spacing.

11. The method of claim 1, wherein the acquiring, by each unmanned air vehicle, of the information, comprises receiving the information from the one or more other unmanned air vehicles through a common radio channel.

12. The method of claim 1, wherein:
the central line has an endpoint, and
the method further comprises acquiring, by each unmanned air vehicle, information on the linear distance from the endpoint, along the central line, of the one or more other unmanned air vehicles.

13. The method of claim 1, wherein:
an unmanned air vehicle, of the one or more other unmanned air vehicles, is on a flyway having an identifier, and
the method further comprises acquiring, by another unmanned air vehicle of the plurality of unmanned air vehicles, the identifier.

14. The method of claim 1, further comprising:
calculating, by a first unmanned air vehicle on the first flyway, of the plurality of unmanned air vehicles, a first local vehicle density;
calculating, by a second unmanned air vehicle on the first flyway, of the plurality of unmanned air vehicles, a second local vehicle density; and
acquiring, by a third unmanned air vehicle on the first flyway, of the plurality of unmanned air vehicles, the first local vehicle density and the second local vehicle density.

15. The method of claim 14, further comprising:
calculating, by the third unmanned air vehicle, a density slope from the first local vehicle density and the second local vehicle density; and
adjusting, by the third unmanned air vehicle, a speed of the unmanned air vehicle, the adjusting being in accordance with the density slope.

16. The method of claim 1, wherein the adjusting comprises:
determining, for each of a plurality of neighboring vehicles, of the one or more other unmanned air vehicles, for which an extrapolated nearness is less than a threshold, a collision avoidance yaw angle; and
forming a sum of the collision avoidance yaw angles.

17. The method of claim 16, wherein the adjusting further comprises:
adding to the sum of the collision avoidance yaw angles an inflow field yaw angle, to form a total yaw angle; and
multiplying the total yaw angle by a set factor to form a target yaw rate.

18. The method of claim 16, further comprising acquiring, by each unmanned air vehicle, an identifier of one or more respective flyways being used by the one or more other unmanned air vehicles,
wherein the forming of the sum of the collision avoidance yaw angles comprises forming a weighted sum of the collision avoidance yaw angles, the weighted sum having a smaller weight for an unmanned air vehicle on the first flyway as the unmanned air vehicle than for an unmanned air vehicle not on the first flyway.

19. The method of claim 18, wherein the adjusting further comprises:
adding to the sum of the collision avoidance yaw angles an inflow field yaw angle, to form a total yaw angle;
multiplying the total yaw angle by a set factor to form a target yaw rate; and
reducing the magnitude of the target yaw rate to a maximum vehicle yaw rate, when the magnitude of the target yaw rate exceeds the maximum vehicle yaw rate.

20. The method of claim 1, wherein the defining of the first flyway comprises defining the first flyway by a user device, the user device comprising a human machine interface and being configured to receive user input for parameters of the first flyway.

21. The method of claim 20, wherein the user device includes a graphical user interface for:
displaying existing flyways to a user, and
receiving, from the user, parameters of flyways to be added.

22. The method of claim 21, wherein the user device is configured:
to receive, from the user, a sequence of flyways, and
to determine whether the sequence is valid.

23. The method of claim 1, wherein each unmanned air vehicle comprises:

an autopilot circuit for receiving guidance commands and controlling flight actuators of the unmanned air vehicle; and a navigation circuit, the navigation circuit being in a peripheral device separate from the autopilot circuit, wherein:

the acquiring of the information comprises acquiring the information by the navigation circuit, and the adjusting of the direction comprises:

calculating the direction by the navigation circuit; and sending the calculated direction to the autopilot circuit by the navigation circuit as part of a guidance command.

* * * * *